United States Patent Office 3,157,395
Patented Nov. 17, 1964

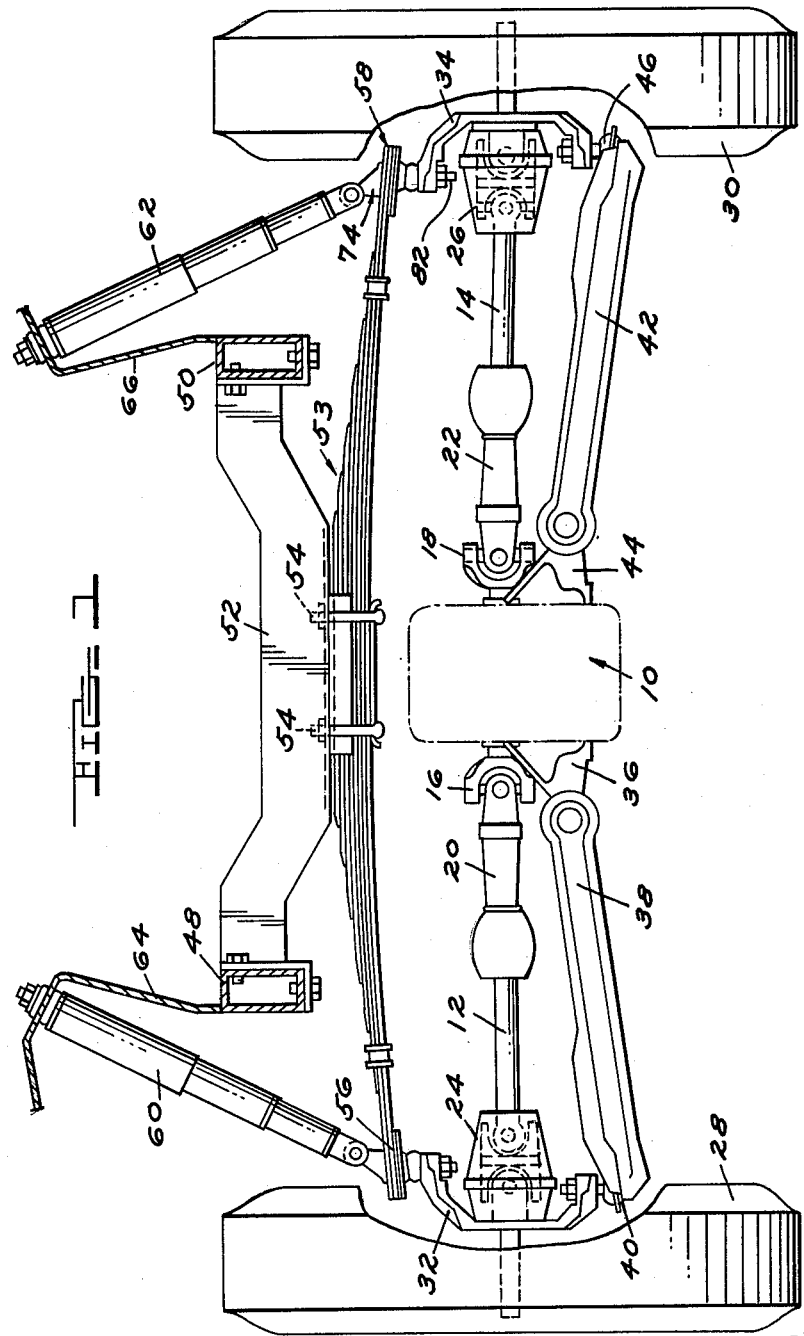

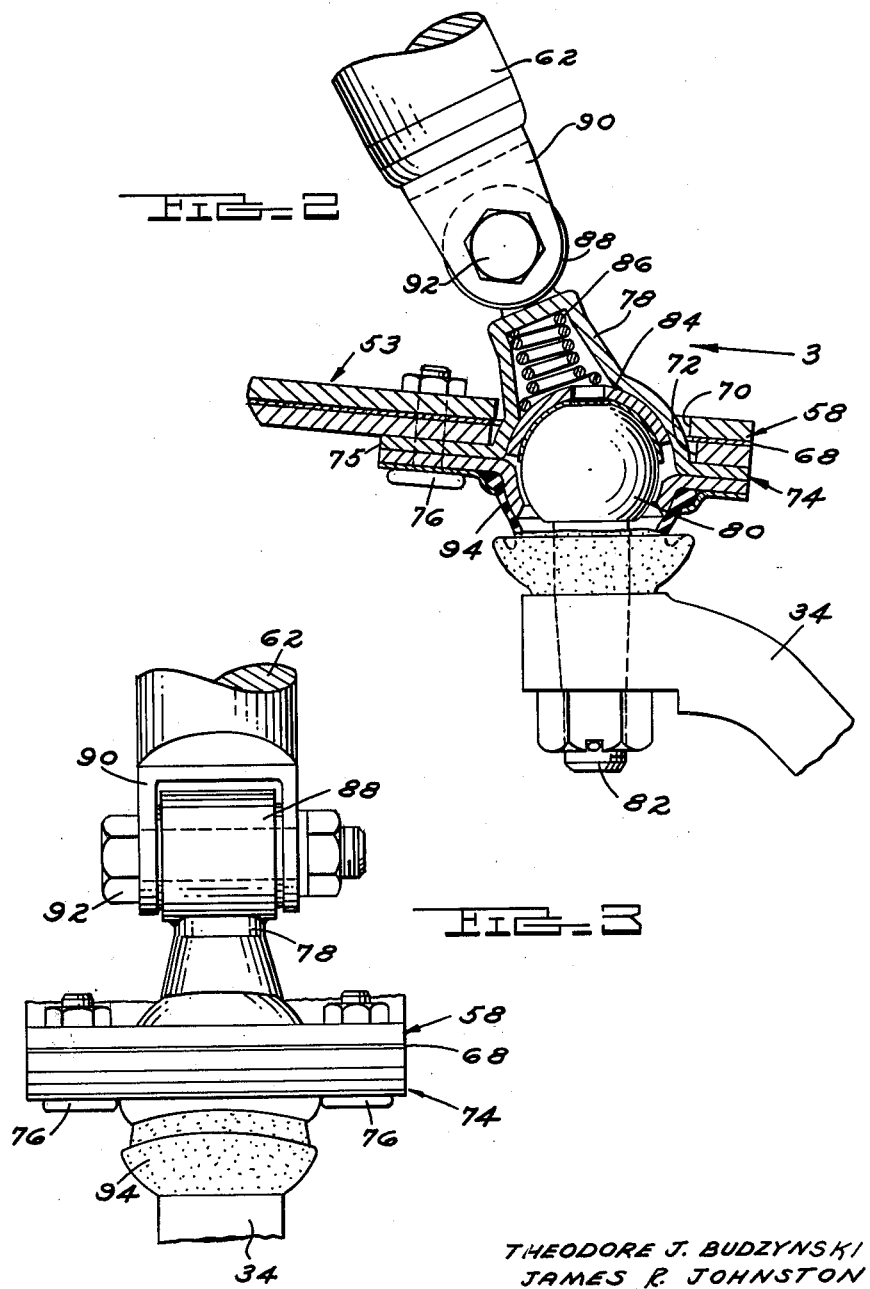

3,157,395
VEHICLE SUSPENSION CONSTRUCTION
Theodore J. Budzynski, Detroit, and James R. Johnston, Tecumseh, Mich., assignors to Ford Motor Company, Dearborn, Mich., a corporation of Delaware
Filed Dec. 7, 1961, Ser. No. 157,744
4 Claims. (Cl. 267—19)

The present invention relates generally to vehicle suspension constructions and more particularly to means for mounting a leaf spring and a shock absorber upon a wheel spindle.

It is the principal object of the present invention to provide an economical compact suspension arrangement employing a leaf spring, a wheel spindle and a telescopic shock absorber that are connected at a common point.

More specifically, one of the embodiments of the present invention provides a ball joint assembly having the shank of its ball member secured to the wheel spindle and its socket portion secured to both the shock absorber and the leaf spring.

The objects and advantages of the present invention will become amply apparent from the following description and the accompanying drawings, in which:

FIGURE 1 is a front elevational view of a vehicle suspension incorporating the present invention;

FIGURE 2 is an enlarged front elevational view partly in section disclosing the construction employed to connect the shock absorber, leaf spring and wheel spindle; and, FIGURE 3 is a side elevational view of the suspension of FIGURE 2.

Referring now to FIGURE 1 for a more detailed description of the present invention, an independent suspension system is shown. The vehicle with which the suspension system is associated has a power unit 10 from which a pair of left and right drive shafts 12 and 14 extend.

The inner ends of shafts 12 and 14 are connected to the power unit 10 by means of universal joints 16 and 18 and slip-splines 20 and 22. The outer ends of the shafts 12 and 14 are provided with universal joints 24 and 26. The joints 24 and 26 in turn are drivingly connected to steerable road wheels 28 and 30. Left and right wheel spindles 32 and 34 rotatably support the output member of the outer universal joints 24 and 26.

A pivot bracket 36 is secured to the left side of the power unit 10 and pivotally supports a suspension arm 38. The outer end of arm 38 is joined to the wheel spindle 32 by means of a ball joint 40. In a similar fashion, the right side has a lower suspension arm 42 pivotally connected to a bracket 44 at its inner end and to the right spindle 34 by means of a ball joint 46.

The power unit 10 is mounted upon the frame of the vehicle which includes a pair of side rails 48 and 50 that are interconnected by a cross-frame member 52. A transversely extending leaf spring 53 is rigidly secured to the cross-frame member 52 by means of U-bolts 54. The left and right ends 56, 58 of leaf spring 53 terminate adjacent the upper ends of the left and right wheel spindles 32 and 34.

Left and right telescopic shock absorbers 60 and 62 are positioned in sea leg fashion with their upper ends secured to reinforced sheet metal 64 and 66 extending from the frame side rails 48 and 50.

In accordance with the present invention, means are provided for connecting the outer ends 56 and 58 of the leaf spring 53 with the upper end of the wheel spindles 32 and 34 and the lower end of the shock absorbers 60 and 62. More specifically, as seen in FIGURE 2, the right end 58 of spring 53 comprises a pair of leaf spring elements that are separated by a liner 68. A pair of aligned openings 70 and 72 are provided in the spring end 58.

A ball joint assembly has a socket member 74 formed with a circumferential flange 75 that is secured to the underside of the spring end 58 by means of bolts 76. An upper portion 78 of the socket 74 protrudes through the openings 70, 72 in the spring end 58.

A ball-headed stud 80 is seated in the socket 74 and has its shank portion 82 secured to the right wheel spindle 34. The ball portion of the stud 80 rests within a hemispherical bearing piece 84 positioned in the socket 74 and located by a coil spring 86 contained within the protruding portion 78. The ball joint assembly is completed by a flexible boot type seal 94 that is placed about the shank 82 and the opening in the socket 74.

A cylindrical eye 88 is welded to the end of the protruding portion 78. A channel-shaped mounting bracket 90 having a pair of spaced apart side flanges is welded to the end of the shock absorber 62. A bolt 92 passes through the bracket 90 concentrically within the eye 88. A rubber bushing may be provided at this connection for isolating objectionable vibrations.

FIGURES 2 and 3 illustrate the construction at the right-hand end 58 of the spring 53. The construction at the left-hand spring end 56 is similar.

This invention provides a compact efficient construction for joining a wheel spindle, a leaf spring and a shock absorber at a common point by employing a ball joint in which the socket portion performs a plurality of functions.

Modifications and alterations of this invention may occur to those skilled in the art which will come within the scope and spirit of the following claims.

We claim:

1. A suspension construction having a ball joint, a leaf spring, a telescopic shock absorber and a wheel spindle;
   said leaf spring having an apertured end;
   said ball joint having a socket portion protruding through said apertured end;
   said joint having a ball portion secured to said spindle; and,
   a pivotal connection between said shock absorber and said protruding socket portion.

2. A vehicle suspension construction having a leaf spring, a wheel spindle, a shock absorber, and a ball and socket type joint;
   the socket portion of said joint being secured to the end of said spring;
   the ball portion of said joint being secured to said spindle; and,
   a pivotal connection between said shock absorber and said socket portion.

3. A vehicle suspension construction having a wheel support member, a shock absorber, a ball and socket joint and a wheel positioning suspension member;
   said joint having a ball part secured to said wheel support member;
   said suspension member having an apertured end;

said joint having a socket part with a portion protruding through said apertured end; and, a pivotal connection between said shock absorber and said protruding socket part portion.

4. The combination of claim 3 wherein said socket part has a radially extending flange;

said flange being situated on one side of said suspension member and said portion protruding from the other side of said suspension member.

References Cited in the file of this patent

UNITED STATES PATENTS

| | | |
|---|---|---|
| 1,711,881 | Fornaca | May 7, 1929 |
| 1,864,625 | Wells | June 28, 1932 |
| 2,124,088 | Stout | July 19, 1938 |
| 2,290,923 | Wahlberg | July 28, 1942 |
| 2,635,894 | Jackman | Apr. 21, 1953 |
| 2,756,067 | Porsche et al. | July 24, 1956 |
| 3,055,676 | McCord | Sept. 25, 1962 |